J. H. HEFFERNAN.
SHOE FOR AUTOMOBILE TIRES.
APPLICATION FILED APR. 7, 1916.
1,249,623.
Patented Dec. 11, 1917.
2 SHEETS—SHEET 1.
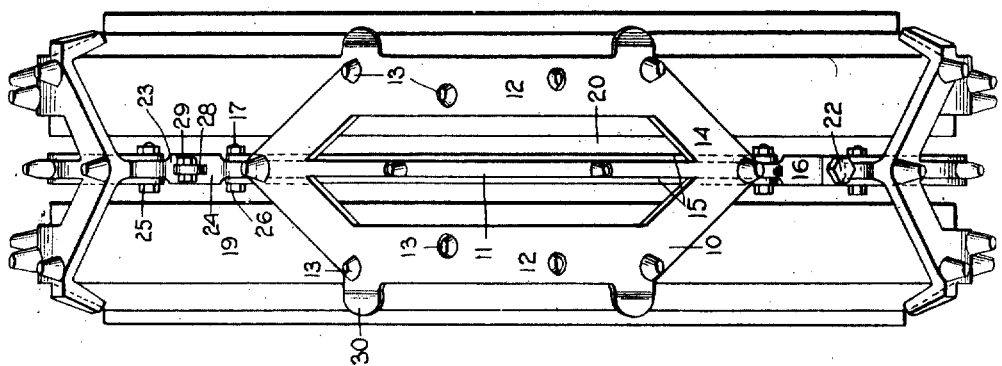
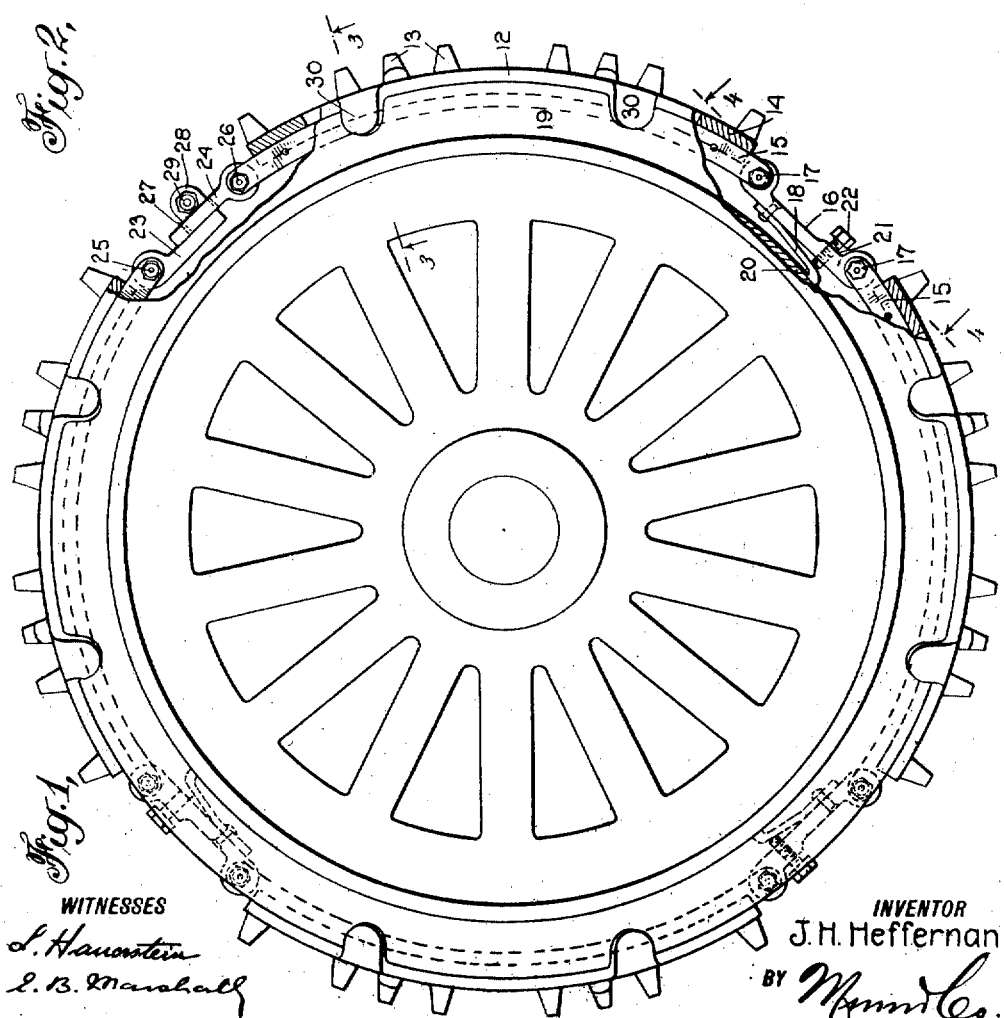

J. H. HEFFERNAN.
SHOE FOR AUTOMOBILE TIRES.
APPLICATION FILED APR. 7, 1916.
1,249,623.
Patented Dec. 11, 1917.
2 SHEETS—SHEET 2.
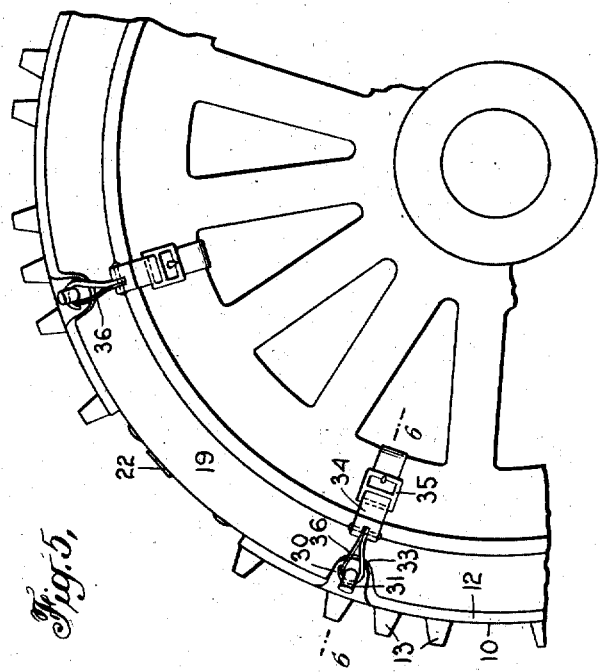
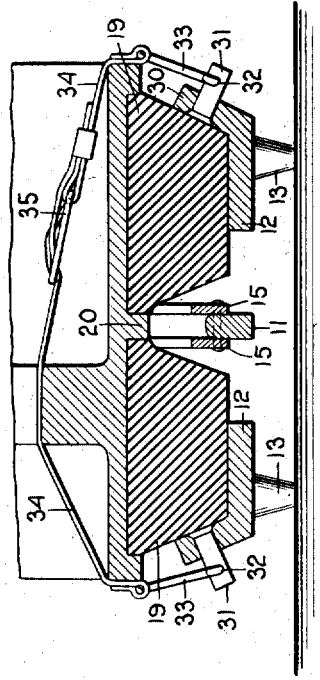
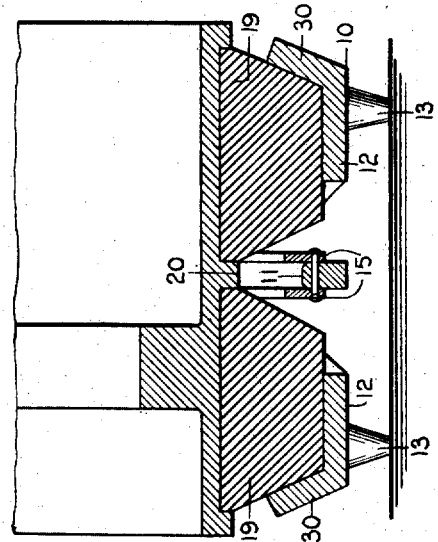
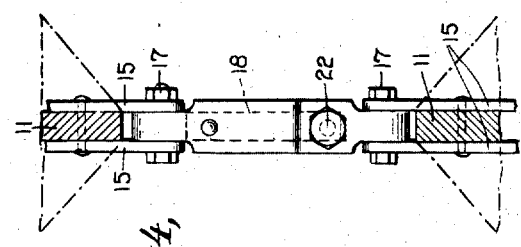
WITNESSES
L. Hauerstein
E. B. Marshall
INVENTOR
J. H. Heffernan
BY Munn & Co.
ATTORNEYS

UNITED STATES PATENT OFFICE.

JAMES HENRY HEFFERNAN, OF ALBANY, NEW YORK.

SHOE FOR AUTOMOBILE-TIRES.

1,249,623.  Specification of Letters Patent.  Patented Dec. 11, 1917.

Application filed April 7, 1916. Serial No. 89,549.

*To all whom it may concern:*

Be it known that I, JAMES HENRY HEFFERNAN, a citizen of the United States, and a resident of Albany, in the county of Albany and State of New York, have invented a new and Improved Shoe for Automobile-Tires, of which the following is a full, clear, and exact description.

My invention has for its object to provide detachable shoes for automobile tires which may be disposed around double tires, the shoes being connected together by links normally disposed in the space between the double tires, the said links carrying members for engaging the steel rim of the wheel between the tires to prevent the rotation of the rim relatively to the shoes.

Other objects of the invention are to provide lugs on the shoes to engage the sides of the tires to prevent lateral displacement, to provide novel means for detachably connecting two of the shoes, to provide straps for holding the shoes in position, and to so construct the shoes that while they will be strong, they will be very light in weight.

Additional objects of the invention will appear in the following specification, in which the preferred form of the invention is described.

In the drawings similar reference characters denote similar parts in all the views, in which—

Figure 1 is a side elevation of an automobile wheel provided with my improved shoes, parts being broken away to illustrate the construction;

Fig. 2 is an edge view of the wheel;

Fig. 3 is an enlarged sectional view substantially on the line 3—3 of Fig. 1;

Fig. 4 is a sectional view on the line 4—4 of Fig. 1;

Fig. 5 is a fragmentary view showing a modified form of the invention; and

Fig. 6 is an enlarged sectional view on the line 6—6 of Fig. 5.

By referring to the drawings, it will be seen that a plurality of shoes 10 is provided, these shoes being preferably four in number, and being connected by links which I will shortly describe. Each of the shoes has a central portion 11 and side portions 12, the said portions 11 and 12 being longitudinally disposed and being spaced from each other. These portions 11 and 12 are provided with calks 13, and they are connected at their ends by end portions 14. Disposed at each side of the central portion 11 there are plates 15, these plates 15 being bolted or riveted to the central portion 11, as illustrated in Fig. 3 of the drawings. The plates 15 extend beyond the shoes 10, and are connected with the plates 15 on the neighboring shoes 10, in a manner which I will now describe.

The shoes 10 at three sets of ends are connected by three links 16, the ends of the links being disposed between the ends of the plates 15 and being articulated thereto by bolts 17. Each of these links 16 has secured to it a resilient dog 18 which extends down between rubber tires 19 of the wheel, for engagement with a steel rim 20 with which wheels of this type are provided. As a means of holding the resilient dog 18 in engagement with the steel rim 20, I provide the links 16 with threaded orifices 21 in which mesh screws 22, the said screws 22 engaging the resilient dogs 18 to hold them against the steel rim 20. As will be seen by referring to the drawings, the links 16 as well as the plates 15 will be disposed between the rubber tires 19, which are spaced apart as shown in the drawings. Three of the connections between the four shoes 10 are constructed in the manner described, the remaining set of ends of the shoes 10 being connected by links 23 and 24, the link 23 being articulated to ends of a pair of plates 15 by a bolt 25, and the link 24 being articulated to a similar pair of plates 15 by a bolt 26. The link 24 has an opening 27 through which a dog 28 on the link 23 is normally disposed, the said dog 28 having an opening through which a bolt passes, the end of this bolt being threaded, upon which a nut is to be screwed, thereby holding the dog 28 in position. It will be understood that after the shoes 10 have been disposed around the automobile wheel, the links 23 and 24 may be connected together by the means described, after which the screws 22 may be turned as may be desired, to press the resilient dogs 18 against the steel rim 20.

Extending from the outer sides of the side portions 12 of the shoes 10, there are lugs 30 which engage the outer sides of the rubber tires 19, it being possible, when desired, to provide the lugs 30 with pins 31 having orifices 32 therein through which hooks 33 may be disposed, straps 34 being secured to these hooks 33 and being disposed around the inner side of the rim, and being connected by a buckle 35 in a manner well understood. The hooks 33 are preferably provided with spring keepers 36.

Having thus described my invention, I claim as new, and desire to secure by Letters Patent:

1. A plurality of shoes adapted to be disposed around a wheel, a link connecting two of the shoes, and an adjustable dog mounted on the link for engaging the wheel for the purpose specified.

2. A plurality of shoes adapted to be disposed around a wheel, a link connecting two of the shoes and having a threaded opening, a dog mounted on the link for engaging the wheel, and a screw meshing in the threaded opening for engaging the dog for the purpose specified.

3. In an article of the class described, a plurality of shoes adapted to be disposed around a wheel, a link connecting two shoes, a dog mounted on the link for engaging the wheel, and adjustable means for pressing the dog against the wheel.

In testimony whereof I have signed my name to this specification in the presence of two subscribing witnesses.

JAMES HENRY HEFFERNAN.

Witnesses:
JOSEPH H. CARROLL,
W. C. REYNOLDS.

Copies of this patent may be obtained for five cents each, by addressing the "Commissioner of Patents, Washington, D. C."